US010810003B2

(12) United States Patent
Gainsborough et al.

(10) Patent No.: US 10,810,003 B2
(45) Date of Patent: Oct. 20, 2020

(54) METHOD AND SYSTEM FOR OPTIMIZATION OF CONTAINER IMAGE LAYERING

(71) Applicant: salesforce.com, inc., San Francisco, CA (US)

(72) Inventors: Matthew Gainsborough, Oakland, CA (US); Sreeram Duvur, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 29 days.

(21) Appl. No.: 16/262,818

(22) Filed: Jan. 30, 2019

(65) Prior Publication Data

US 2020/0241867 A1    Jul. 30, 2020

(51) Int. Cl.
*G06F 9/44*  (2018.01)
*G06F 8/65*  (2018.01)

(52) U.S. Cl.
CPC ...................... *G06F 8/65* (2013.01)

(58) Field of Classification Search
CPC .............................. G06F 8/65; G06F 8/60–64
USPC ................................................. 717/170–178
See application file for complete search history.

(56) References Cited

U.S. PATENT DOCUMENTS

| 6,418,554 B1 * | 7/2002 | Delo ........................ G06F 8/61 717/174 |
| 7,707,571 B1 * | 4/2010 | Harris ...................... G06F 8/61 717/174 |
| 8,813,065 B2 * | 8/2014 | Zygmuntowicz ... G06F 9/45558 717/174 |
| 9,256,467 B1 * | 2/2016 | Singh ..................... G06F 9/5055 |
| 9,692,666 B2 * | 6/2017 | Salokanto ........... H04L 41/5054 |
| 9,720,709 B1 * | 8/2017 | Stickle ................ G06F 9/45558 |
| 9,804,901 B2 * | 10/2017 | Gambardella ............ G06F 9/54 |
| 9,823,915 B1 * | 11/2017 | Maloney .................. G06F 8/71 |
| 9,858,187 B2 | 1/2018 | Sundaravaradan et al. |

(Continued)

OTHER PUBLICATIONS

Gholami, et al, "A Framework for Satisfying the Performance Requirements of Containerized Software Systems Through Multi-Versioning", ACM, pp. 150-160 (Year: 2020).*

(Continued)

*Primary Examiner* — Anil Khatri
(74) *Attorney, Agent, or Firm* — Nicholson De Vos Webster & Elliott LLP

(57) ABSTRACT

Methods and systems for optimization of layering of a container image are presented. A modification factor is determined, based on modification events, for each one of multiple software elements. A container image layering structure is determined, based at least in part on the modification factors of the software elements, where the container image layering structure defines a layering order for two or more container sub-images that form the container image, and the layering order determines an order with which container sub-image from the container sub-images are to be executed to form the entire container image, and the container image layering structure further defines for each one of the container sub-images a respective subset of one or more software elements from the plurality of software elements. The container image is deployed based on the container image layering structure to be used for generation of containers in a cloud processing system.

14 Claims, 5 Drawing Sheets

(56) References Cited

U.S. PATENT DOCUMENTS

| | | | |
|---|---|---|---|
| 9,898,354 B2* | 2/2018 | Engel | G06F 9/541 |
| 9,984,002 B2 | 5/2018 | Sundaravaradan et al. | |
| 9,986,031 B2* | 5/2018 | Jain | H04L 67/1095 |
| 9,990,400 B2 | 6/2018 | Sundaravaradan et al. | |
| 10,002,247 B2* | 6/2018 | Suarez | G06F 21/31 |
| 10,007,509 B1* | 6/2018 | Qureshi | H04L 67/34 |
| 10,013,501 B2 | 7/2018 | Sundaravaradan et al. | |
| 10,120,671 B1* | 11/2018 | Li | G06F 9/45545 |
| 10,218,813 B2 | 2/2019 | Peschansky et al. | |
| 10,235,163 B2* | 3/2019 | Carvalho | G06F 8/71 |
| 10,303,388 B1 | 5/2019 | Lieberman | G06F 3/0653 |
| 10,324,696 B2* | 6/2019 | Bhat | G06F 8/51 |
| 10,404,474 B1* | 9/2019 | Caceres | H04L 9/3263 |
| 10,491,664 B2 | 11/2019 | Tan et al. | |
| 10,534,671 B1* | 1/2020 | Zhao | G06F 8/63 |
| 10,732,951 B2* | 8/2020 | Jayanthi | G06F 16/128 |

OTHER PUBLICATIONS

Barna et al, "Delivering Elastic Containerized Cloud Applications to Enable DevOps", IEEE, pp. 65-75 (Year: 2017).*
Buzachis et al, "Towards Osmotic Computing: Analyzing Overlay Network Solutions to Optimize the Deployment of Container-Based Microservices in Fog, Edge and IoT Environments", IEEE, pp. 1-10 (Year: 2018).*
Lottiaux et al, "Containers : A Sound Basis for a True Single System Image", IEEE, pp. 66-73 (Year: 2001).*
Syed et al, "The Secure Software Container Pattern", ACM, pp. 1-7 (Year: 2017).*
Ahmed et al, "Docker Container Deployment in Fog Computing Infrastructures", IEEE,, pp. 1-8 (Year: 2018).*
Cranefield et al, "Agent-Based Container Terminal Optimisation", ACM, pp. 1113-114 (Year: 2011).*
"About storage drivers," Retrieved from https://docs.docker.com/storage/storagedriver/ on Jan. 30, 2019, 10 pages.
Christensen G., "Optimising Docker Layers for Better Caching with Nix," Oct. 1, 2018, Retrieved from https://grahamc.com/blog/nix-and-layered-docker-images on Jan. 30, 2019, 12 pages.
"Docker Enterprise," Retrieved from https://docs.docker.com/ee/ on Jan. 30, 2019, 6 pages.
"Docker overview," Retrieved from https://docs.docker.com/engine/docker-overview/ on Jan. 30, 2019, 7 pages.
"Enabling Docker Layer Caching," Retrieved from https://circleci.com/docs/2.0/docker-layer-caching/ on Jan. 30, 2019, 11 pages.
"Get Started," Retrieved from https://docs.docker.com/get-started/ on Jan. 30, 2019, 48 pages.
Goundan A., et al., "Introducing Jib—Build Java Docker Images Better," Jul. 9, 2018, Google Cloud Platform Blog, Retrieved from https://cloudplatform.googleblog.com/2018/07/introducing-jib-build-java-docker-images-better.html on Jan. 31, 2019, 6 pages.
Jessica, "Digging into Docker layers," Medium, Nov. 12, 2016, Retrieved from https://medium.com/@jessgreb01/digging-into-docker-layers-c22f948ed612 on Jan. 30, 2019, 8 pages.
Russt, "Building Large Docker Images, Quickly," Mar. 26, 2018, Retrieved from https://russt.me/2018/03/building-large-docker-images-quickly/ on Jan. 30, 2019, 8 pages.

* cited by examiner

DETERMINE, BASED ON MODIFICATION EVENTS, FOR EACH ONE OF A PLURALITY OF SOFTWARE ELEMENTS A MODIFICATION FACTOR INDICATIVE OF THE RATE OF CHANGE OF THE SOFTWARE ELEMENT DURING THE INTERVAL OF TIME, WHERE THE CONTAINER IMAGE IS TO BE GENERATED BASED ON THE PLURALITY OF SOFTWARE ELEMENTS, AND WHERE EACH MODIFICATION EVENT IS INDICATIVE OF ONE OR MORE CHANGES THAT OCCURRED IN ONE OF THE PLURALITY OF SOFTWARE ELEMENTS DURING AN INTERVAL OF TIME
202

DETERMINE A NUMBER OF RELEASE EVENTS OF THE PLURALITY OF SOFTWARE ELEMENTS IN WHICH A CHANGE OCCURRED IN THE SOFTWARE ELEMENT DURING THE INTERVAL OF TIME, WHERE A RELEASE EVENT OF THE PLURALITY OF SOFTWARE ELEMENTS CAUSES AN UPDATE OF THE CONTAINER IMAGE
214

DETERMINE A TOTAL NUMBER OF RELEASE EVENTS OF THE PLURALITY OF SOFTWARE ELEMENTS
216

OBTAIN THE MODIFICATION FACTOR FOR THE SOFTWARE ELEMENT BY DIVIDING A NUMBER OF RELEASE EVENTS OF THE PLURALITY OF SOFTWARE ELEMENTS IN WHICH A CHANGE OCCURRED IN THE SOFTWARE ELEMENT DURING THE INTERVAL OF TIME BY A TOTAL NUMBER OF RELEASES OF THE PLURALITY OF SOFTWARE ELEMENTS THAT OCCURRED DURING THE INTERVAL OF TIME
218

FIG. 2B

DETERMINE A CONTAINER IMAGE LAYERING STRUCTURE, BASED AT LEAST IN PART ON THE MODIFICATION FACTORS OF THE SOFTWARE ELEMENTS, WHERE THE CONTAINER IMAGE LAYERING STRUCTURE DEFINES A LAYERING ORDER FOR TWO OR MORE CONTAINER SUB-IMAGES THAT FORM THE CONTAINER IMAGE, WHERE THE LAYERING ORDER DETERMINES WHICH CONTAINER SUB-IMAGE FROM THE CONTAINER SUB-IMAGES IS TO BE STORED ABOVE WHICH OTHER SUB-IMAGE FROM THE SUB-IMAGES WHEN THE CONTAINER IMAGE IS GENERATED, AND THE CONTAINER IMAGE LAYERING STRUCTURE FURTHER DEFINES FOR EACH ONE OF THE CONTAINER SUB-IMAGES A RESPECTIVE SUBSET OF ONE OR MORE SOFTWARE ELEMENTS FROM THE PLURALITY OF SOFTWARE ELEMENTS
204

DETERMINE THE CONTAINER IMAGE LAYERING STRUCTURE IS FURTHER BASED ON DEPENDENCIES BETWEEN THE SOFTWARE ELEMENTS
222

DETERMINE THE CONTAINER IMAGE LAYERING STRUCTURE IS FURTHER BASED ON THE PREDETERMINED STORAGE SIZE SUCH THAT A CUMULATIVE STORAGE SIZE OF SOFTWARE ELEMENTS SELECTED TO BE INCLUDED IN EACH ONE OF THE CONTAINER SUB-IMAGES DOES NOT EXCEED THE PREDETERMINED STORAGE SIZE
224

226

CATEGORIZE THE MODIFICATION EVENTS BASED ON THE PLURALITY OF SOFTWARE ELEMENT CATEGORIES
228

DETERMINING A CONTAINER IMAGE LAYERING STRUCTURE IS FURTHER BASED ON THE CATEGORIZATION OF THE MODIFICATION EVENTS
230

FIG. 2C

METHOD AND SYSTEM FOR OPTIMIZATION OF CONTAINER IMAGE LAYERING

TECHNICAL FIELD

One or more implementations relate to the field of software update; and more specifically, to the optimization of container image layering in cloud services.

BACKGROUND ART

"Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The term "micro-services architecture" refers to an architecture in which each of the micro-services does just one thing efficiently and interacts with others of the micro-services as needed. This contrasts with monolithic architectures in which complex software is run on a single, powerful server. Each of the micro-services may use a different type of hardware and/or software to respectively perform a specialized type of processing different from the types of processing performed by the other micro-services. Moreover, the micro-services architecture allows an application to be decomposed into different ones of these smaller micro-services, improving modularity and making the program code easier to understand, design and test. For example, individual micro-services may be modified (e.g., upgraded, swapped out) without affecting the operation of other micro-services used by the application.

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including Docker. A micro-service can be packaged as a container image to be executed within a container. A container is a self-contained execution environment, such as a Linux execution environment; in other words, a container is a standard unit of software that packages up code and all its dependencies, so the application runs quickly and reliably from one computing environment to another. A container image is used to create one or more containers at runtime. A container image is a lightweight, standalone, executable package of software that includes everything needed to run an application: code, runtime, system tools, system libraries and settings. (e.g., a Docker container image becomes a Docker container when it is run on Docker Engine).

A container image can include multiple sub-images that are referred to as layers. Typically, sub-images are read-only files that are stacked on top of one another over a base sub-image. The base sub-image is usually an image of a guest Operating System (OS) or an image of the OS along with one or more libraries). Container image(s) are registered and stored within a container registry to which a controller of the COS has access.

When an image is pulled down from a repository or when a container is created from an image that does not yet exist locally (for example during a service build), each sub-image is pulled down separately, and stored in a local storage area.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2B is a flow diagram illustrating exemplary operations for determination of a modification factor of a software element according to some example implementations.

FIG. 2C is a flow diagram illustrating exemplary operations for the determination of a container image layering structure according to some example implementations.

DETAILED DESCRIPTION

Figure 1:
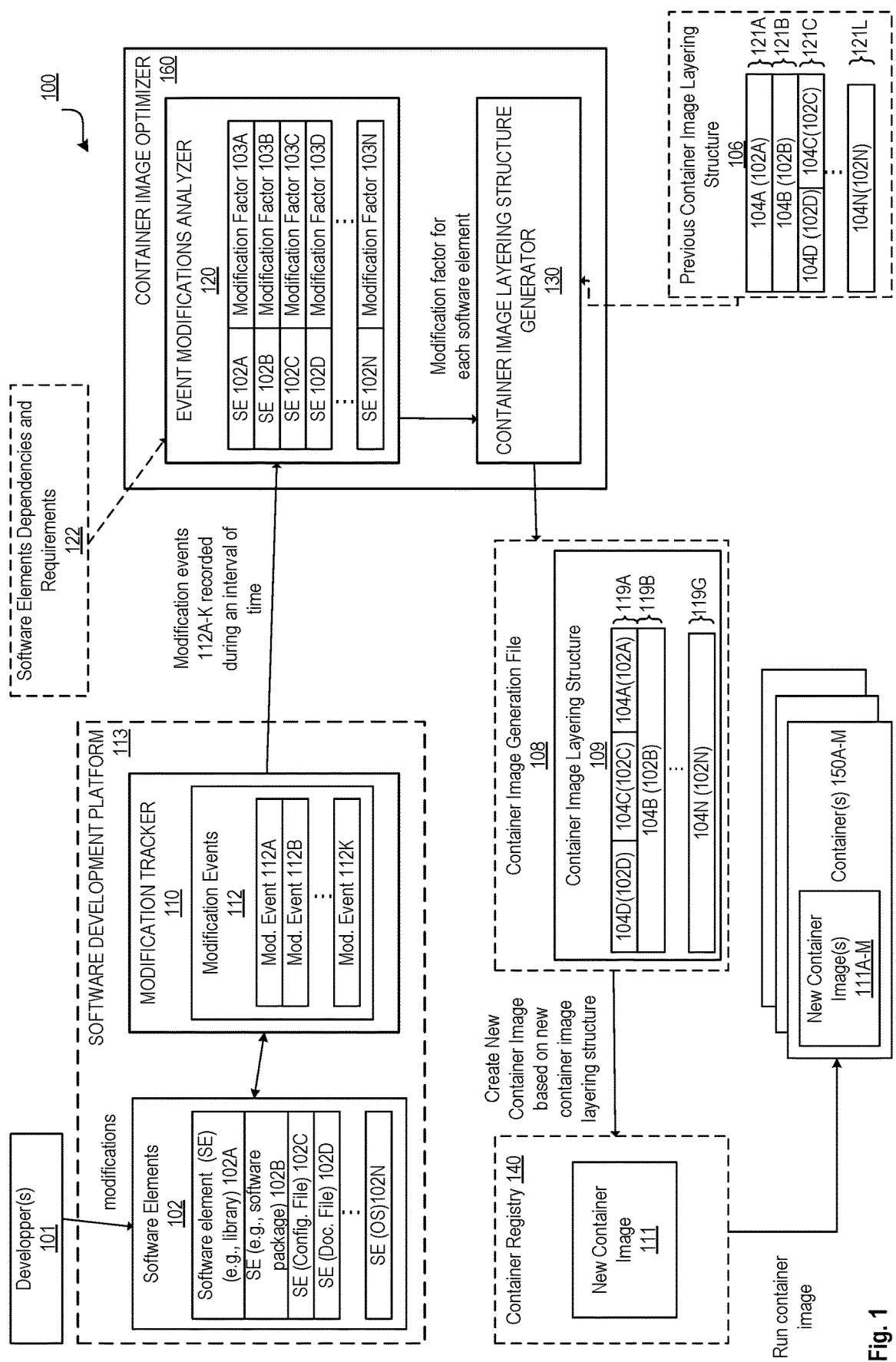
FIG. 1 is a block diagram illustrating an exemplary system for optimization of container image layering according to some example implementations.

The following description describes methods and apparatus for optimization of container image layering.

Overview:

A container image is used to create one or more containers at runtime. A container image is a lightweight, standalone, executable package of software that includes everything needed to run an application: code, runtime, system tools, system libraries and settings. (e.g., a Docker container image becomes a Docker container when it is run on Docker Engine). A container image is generated based on multiple software elements (e.g., packages, documentation files, system library files, library files, configuration/settings files, runtime, etc.) that are executable.

A container image can include multiple sub-images that are referred to as layers. Typically, sub-images are read-only files that are stacked on top of one another over a base sub-image. The base sub-image is usually an image of a guest Operating System (OS) or an image of the OS along with one or more libraries). Each one of the sub-images includes a subset of the software elements of the container image. A container image layering structure (which can be referred to as "layering structure") defines a layering order for two or more container sub-images that form the container image. The layering order determines an order with which the container sub-images are to be executed to form the entire container image, and the container image layering structure further defines for each one of the container sub-images a respective subset of one or more software elements from the plurality of software elements.

In some implementations, the sub-images include respective disjoint subsets of software elements, such that each software element is only added to a single one of the sub-images. In another implementation, there may be an overlap between the different sub-images such that one or more software element may be present in at least two sub-images. In some of these implementations, the same version of the software element can be present in the two sub-images. In other implementations, different version of the software element can be present in each one of the sub-images, in which case, the software element that is included in the sub-image replaces the equivalent contents from earlier sub-images (i.e., sub-images that are under the sub-image).

Container image(s) are registered and stored within a container registry to which a controller of the COS has access. When a container is generated (for example by pulling down an image from a repository or from another location in the cloud), each sub-image is pulled down separately, and stored in a local storage area. A container image can be cached in a local cache of the client to create the container. Containers are assembled from images (e.g., pulled from the repository or created from an image that is not present locally) starting from a base sub-image (which can be the OS or a combination of OS and a set of libraries) and going up to the other sub-images based on the container image layering structure of the image. In some implementations, the container includes an additional sub-image (read/write image) that is added to the image stored in the repository. The additional sub-image is used to store the state of the container (in which data that is specific to the given container can be written and read). The composition of the container includes the copy of the image in a strictly bottom-up mechanism and assumes that each sub-image that is underneath another sub-image in the layering structure of the image can be modified by this latter sub-image.

When an update of a software element occurs, this causes an update of the image stored in the local cache of the client. Further, when one or more software elements forming the image are updated (e.g., for a bug fix, new features added to the service, etc.) one or more other software elements forming the image may not change (for example, the base OS sub-image does not usually change, and it may likely be present in the client local cache. Some existing caching mechanisms cause the entire image to be updated when there is an update to a software element that is part of a sub-image of the image. In other existing caching mechanisms, a subset of the sub-images can be re-uploaded to the repository and/or the local storage area in the client. In these mechanisms any sub-image including an updated software element is updated as well as all the sub-images that are located on top of the sub-image to be updated are reloaded. These additional sub-images are re-uploaded regardless of whether or not they include software elements that were updated.

The size of a container image and its associated layering structure (e.g., the size and placement of the software element in each sub-image) can have significant implications in the operational efficiency of the deployment of the image. When an image is downloaded at the client, multiple sub-images may be concurrently transferred. Having more sub-images allows for quicker materialization of the container and availability of the service implemented through the container image.

The implementations described herein allow for optimization of a container image layering structure. The present implementations focus on the determination of an optimal layering structure of a container image to allow for greater efficiency of deployment of the container image. For example, an optimal layering structure of an image container can allow for a quick transfer of the container image to the container registry and/or to the download of the container image in the client. The quick transfer is obtained as a result of an optimal container image layering structure that causes only a smaller number of sub-images to be updated.

The implementations described herein present a mechanism that 1) analyzes the changes that are made to the software elements forming an image over a period of time, and 2) determines an optimal layering structure based on the analysis. A mechanism for optimization of layering of a container image is presented. The mechanism includes determining, based on modification events, for each one of multiple software elements a modification factor indicative of the rate of change of the software element during the interval of time. The container image is to be generated based on the plurality of software elements, and where each modification event is indicative of one or more changes that occurred in one of the software elements during an interval of time. The mechanism further includes determining a container image layering structure, based at least in part on the modification factors of the software elements, where the container image layering structure defines a layering order for two or more container sub-images that form the container image. The layering order determines an order with which container sub-image from the container sub-images are to be executed to form the entire container image, and the container image layering structure further defines for each one of the container sub-images a respective subset of one or more software elements. The mechanism causes the container image to be deployed based on the container image layering structure to be used for generation of one or more containers in a cloud processing system.

Exemplary System

FIG. 1 is a block diagram illustrating an exemplary system for optimization of container image layering according to some example implementations.

The system 100 includes a container image optimizer 160 as part of a system 100 for enabling optimization of container image layering and allowing efficient deployment and update of container images. The container image optimizer 160 is coupled with modification tracker 110, and optional container registry 140.

The container image optimizer 160 includes an event modifications analyzer 120 and a container image layering structure generator 130. The system includes a set of software elements 102 including software elements (SE) 102A-N, which are portions of software used to generate a container image. Each SE can be one of a different category of software such as that a software package, a documentation file, a configuration file, a library file or any other category of software element that may be used to create a container image. The software elements when in their executable form include everything needed to run an application: code, runtime, system tools, system libraries and settings. In a non-limiting example, the software elements 102 includes source software files used to generate the container image. For example, the source files include configuration files, java code compiled and delivered as Jar files, third party and internal libraries, documentation (htdocs), source code of the base image (OS) and program resources. Each software element is modified by one or more developers at different moments in time. The modifications can be made at different moments in time for each one of the software elements and may be independent from one another. In some implementations, the system is subject to release timeline in which the modifications of the software elements need to be rolled into a new container image.

The modification tracker 110 is operative to track the modifications and changes that occur in the software elements 102 over time. The modification tracker 110 is a software element repository that continuously records changes that occur in each one of the software elements 102. In some implementations, the modification tracker 110 can be part of a software development platform 113 that is used by the developers 101 to create and/or update the software elements 102. In other implementations, the modification tracker 110 is external to the software development platform 113 and is coupled with the software development platform 113 to track the modifications that are made by the developers to the software elements 102 in the software development platform 113.

The modification tracker 110 records/stores modification events 112A-K. Each modification event is indicative of one or more changes that occurred in a software element during an interval of time. In some implementations, each modification event 112A-K includes at least one or a combination of an identification of a software element that is modified, a time indicator indicating a time and date at which modification of the software element occurred. In some implementations, the modification event 112A-K may further include in addition to a software element identifier and the time indicator one or more of a project identifier, a directory identifier, an author identifier, a size, and other parameters related to the change that occurred in the software element. The modification events 112A-K are continuously recorded during a first interval of time. The modification events are then transmitted to the event modification analyzer 120. In some implementations, once the modification events 112A-K are transmitted to the event modification analyzer 120 they are deleted/removed from the modification tracker. In other implementations, the modification events 112A-K are not deleted once sent to the event modifications analyzer 120, they are instead stored in the modification tracker and can be retrieved more than once from the modification tracker.

In some implementations, the modification tracker 110 is operative to periodically transmit new modification events stored since the last batch of modification events transmitted to the event modifications analyzer 120. In a non-limiting example, the events can be sent every few hours, every few days, or every few months to the event modifications analyzer 120. In some implementations, the event modification analyzer 120 is operative to transmit requests for the events to the modification tracker 110. The modification tracker 110 is then operative to transmit the event modifications in response to the request. In some implementations, the event modifications analyzer 120 can indicate a time interval for which it needs to receive the modification events and the modification tracker 110 transmits in response to the request all events stored during the interval of time.

The modifications can result from a developer updating a portion of the software element, a deleting a section of the software element, or adding a new section to the software element. The modifications can be made to fix an existing bug in the source code of an application, or to remove a feature from the application, and/or add a feature to the application.

The event modification analyzer determines, based on the received modification events, for each one of the software elements 102 a respective modification factor 103. The modification factors 103A-N are respectively associated with SE 102A-N and are determined based on the modification events 112A-K. A modification factor is indicative of the rate of change of the software element during the interval of time. In some implementations, the determination of the modification factor for a software element can be determined bas The container image optimizer 160 is operative to determine a container image layering structure, based at least in part on the modification factors of the software elements. The container image layering structure (e.g., container image layering structure 109) defines a layering order for two or more container sub-images that form the container image. The layering order determines an order with which the container sub-images are to be executed to form the entire container image, and the container image layering structure further defines for each one of the container sub-images a respective subset of one or more software elements from the software elements 102. In a non-limiting example, the container image layering structure generator 130 of the container image optimizer 160 is operative to determine from the modification factors of the software elements 102 a container image layering structure 109. The container image layering structure 109 includes a set of sub-images 119A-G (which are collectively referred to as sub-images 119). Each one of the sub-images 119 includes a set of elements 104D, 104C, 104A, 104B, . . . 104N. the elements 104A-N correspond to the software elements 102A-N. The elements 104A-N can be identifiers that identify an executable version of the software elements 102. Sub-image 119A includes the identifiers 104A, 104C, and 104D that respectively identify a version of the software elements 102A, 102C, and 102D. In some implementations, the software elements 102 are source code versions of the software elements and the identifiers 104A-N identify executable versions of the software elements which are different from the source versions of the software elements 102. In other implementations, the software elements 102 are executable versions of the software elements and the identifiers 104A-N identify the software elements 102.

The container image layering structure 109 further defines an order for the sub-images 119A-G. The order of the sub-images indicates an order with which the sub-images are to be used to generate a container from the containers 150A-M. In the illustrated example, a base sub-image 119G is to be executed/installed prior to any of the other sub-images 119B and 119A (or any of the intermediary sub-images that are not illustrated). The sub-image 119B is to be executable prior to the sub-image 119A. Thus, the container image layering structure 109 defines a bottom-up structure for the deployment of the multiple sub-images that form the container image.

In some implementation, the container image layering structure 109 can be stored as a container image generation file 108 (e.g., a Dockerfile) that includes instructions defining the sub-images, which when executed cause the generation of a new container image 111. The new container image is to be deployed based on the container image layering structure 109 and is to be used for generation of one or more containers 150A-M in a cloud processing system. In some implementations, the new container image 111 is stored in a container registry 140, which may include one or more additional container images (not illustrated). The new container image 111 can also be copied to one or more local storages (as new container images 111A-K) for execution as containers 150A-M. The new container image 111 is generated based on the container image layering structure 109. The container image layering structure 109 optimizes generation of the image and future updates of the container image 111. For example, block 208 shows that the container image layering structure 109 can be determined by the container image layering structure generator 130 such that software elements that are updated more frequently than other software elements from the software elements are stored as part of top container sub-images of the container image. The container image layering structure generator 130 generates the container image layering structure 109 such that sub-image 119A, which is located on top of sub-image 119B and sub-image 119N includes software elements, identified by 104A, 104C and 104D, which are more frequently updated when compared with the other software elements in the other sub-images. Alternatively, the sub-image 109N, which represents the base sub-image (e.g., the OS), is located at the bottom of the layering structure as this software element is likely to be the most stable element with the least amount of change during the interval of time.

Thus, the determination of the container image layering structure includes selecting a number of sub-images that are to form the container image, the order with which these sub-images are to be deployed to generate the container image, as well as the content of each one of the sub-images (i.e., the respective software elements that are to be included in each one of the sub-images). The determination of the container image layering structure can further be performed based on additional parameters (e.g., based on the software element dependencies and requirements 122, a previous container image layering structure 106, and/or software element categories).

The operations of analyzing the modification events and determining an optimized container image layering structure based on the modification events can be performed at regular interval of times such that the container image layering structure is updated to reflect the new development and modification that occur in the software elements. For example, different software elements may be subject to multiple modification over a first period of time resulting in a first layering structure in which these elements are in a top sub-image of the container image, while these same software elements may not include any associated modification events at a later time resulting in the generation of a second layering structure in which these elements are in a lower level sub-image. Thus, in these implementations, the container image layering structure is continuously updated to adapt to the changes and modifications that occur in the software elements over time.

The implementations described herein enable generation of an optimized container image layering structure. The optimized container image layering structure enables a fast and efficient deployment of a container image and an efficient update of the container image. When an optimized container image is deployed based on the optimized container layering structure, an update of the container image will affect only a small set of the sub-images. Thus, in contrast to conventional approaches in which the rate of change of the software elements was not taken into consideration when the container image layering structure was generated, the present implementations allow for a mechanism of generation of the layering structure that is dynamic and adaptable based on the rate of modification of each software element when compared to other software elements.

This can be particularly useful in the context of complex cloud service offerings (such as a customer relationship management (CRM) service (e.g., Sales Cloud by salesforce.com, Inc.)), which can be implemented using a significantly large container image that includes a large number of software elements. In these exemplary scenarios, the more sub-images that are present in the local storage of the clients, and the more these sub-images are not modified by a new service container image, the more efficient it is to assemble the service container image by reusing what is already present. The implementations described herein allow the automatic identification of the software elements that are modified the most frequently and the automatic determination of the layering structure based on the modification factors such that a container image obtained based on the determined layering structure is optimal.

Exemplary Operations

Figure 2A:
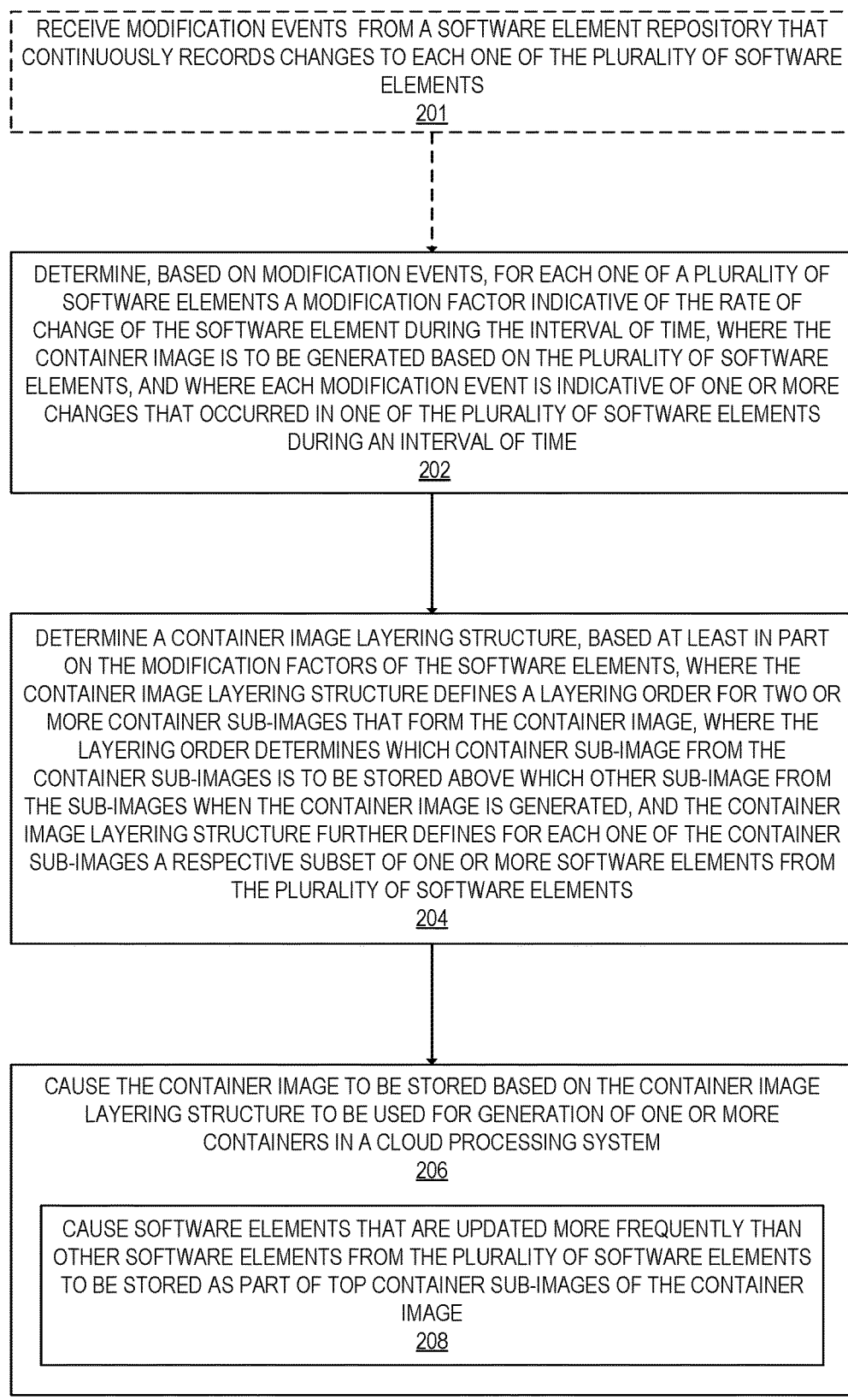
FIG. 2A is a flow diagram illustrating exemplary operations for optimization of container image layering according to some example implementations.

FIG. 2A is a flow diagram illustrating exemplary operations for optimization of container image layering according to some example implementations. In some implementations, the operations of FIG. 2 are performed by the container image optimizer 160. For example, the operations of FIG. 1 can be performed by the modification tracker 110 and the container image layering structure generator 130.

At operation 201, the container image optimizer 160 receives modification events from a software element repository (e.g., the modification tracker 110). The software element repository continuously records changes to each one of the software elements 102 and transmit these changes to the container image optimizer 160. In some implementations, modification events are received at regular interval of times (every N seconds, every N minutes, every N days, or every N months). The modification events can be received at the container image optimizer 160 as a response to a request for the events transmitted from the container image optimizer 160 to the modification tracker 110. In other implementations, the modification events can be transmitted from the modification tracker 110 to the container image optimizer 160 automatically without receipt of a request for the events.

At operation 202, the container image optimizer 160 determines, based on the modification events, for each one of a plurality of software elements a modification factor indicative of the rate of change of the software element during the interval of time. The software elements are used to generate the container image and each modification event is indicative of one or more changes that occurred in one of the software elements during an interval of time. The modifications can result from a developer updating a portion of the software element, a deleting a section of the software element, or adding a new section to the software element. The modifications can be made to fix an existing bug in the source code of an application, or to remove a feature from the application, and/or add a feature to the application.

At operation 204, the container image optimizer 160 determines a container image layering structure, based at least in part on the modification factors of the software elements. The container image layering structure (e.g., container image layering structure 109) defines a layering order for two or more container sub-images that form the container image. The layering order determines an order with which the container sub-images are to be executed to form the entire container image, and the container image layering structure further defines for each one of the container sub-images a respective subset of one or more software elements from the software elements 102. In a non-limiting example, the container image layering structure generator 130 of the container image optimizer 160 determines from the modification factors of the software elements 102 a container image layering structure 109. The container image layering structure 109 includes a set of sub-images 119A-G (which are collectively referred to as sub-images 119). Each one of the sub-images 119 includes a set of elements 104D, 104C, 104A, 104B, . . . 104N. the elements 104A-N correspond to the software elements 102A-N. The elements 104A-N can be identifiers that identify an executable version of the software elements 102. Sub-image 119A includes the identifiers 104A, 104C, and 104D that respectively identify a version of the software elements 102A, 102C, and 102D. In some implementations, the software elements 102 are source code versions of the software elements and the identifiers 104A-N identify executable versions of the software elements which are different from the source versions of the software elements 102. In other implementations, the software elements 102 are executable versions of the software elements and the identifiers 104A-N identify the software elements 102.

The container image layering structure 109 further defines an order for the sub-images 119A-G. The order of the sub-images indicates an order with which the sub-images are to be used to generate a container from the containers 150A-M. In the illustrated example, a base sub-image 119G is to be executed/installed prior to any of the other sub-images 119B and 119A (or any of the intermediary sub-images that are not illustrated). The sub-image 119B is to be executable prior to the sub-image 119A. Thus, the container image layering structure 109 defines a bottom-up structure for the multiple sub-images that form the container image.

In the illustrated example, the container image layering structure 109 is different than the previous container image layering structure 106 which was used to generate containers prior to the determination of the optimized container image layering structure 109. The container image layering structure 106 defines sub-images 121A-L. The number of sub-images 121A-L may be different from the number of sub-images that are to be generated in the new container image layering structure 109. In other implementations, this number remains the same from one structure to another, but the set of software elements included in each sub-image is modified. For example, the container image layering structure generator 130 may determine based on the modification factor of each software element from the previous container image layering structure 106 a sub-image in the new container image layering structure 109 that is to include the software element. In the illustrated example, the container image layering structure generator 130 determines to include element 104D and 104C into sub-image 119A by determining that these two software elements are modified more frequently than the element 104B.

In some implementation, the container image layering structure 109 can be stored as a container image generation file 108 (e.g., a Dockerfile) that includes instructions defining the sub-images, which when executed cause the generation of a new container image 111. The new container image is to be stored based on the container image layering structure 109 and is to be used for generation of one or more containers 150A-M in a cloud processing system. In some implementations, the new container image 111 is stored in a container registry 140, which may include one or more additional container images (not illustrated). The new container image 111 can also be copied to one or more local storages (as new container images 111A-K) for execution as containers 150A-M. The new container image 111 is generated based on the container image layering structure 109 to optimize generation of the image and future updates of the container image 111. For example, block 208 shows that the container image layering structure 109 can be determined by the container image layering structure generator 130 such that software elements that are updated more frequently than other software elements from the software elements are stored as part of top container sub-images of the container image. Referring back to the non-limiting example of FIG. 1, the container image layering structure generator 130 generates the container image layering structure 109 such that sub-image 119A, which is located on top of sub-image 119B and sub-image 119N includes software elements, identified by 104A, 104C and 104D, which are more frequently updated when compared with the other software elements in the other sub-images. Thus, the elements of the previous container image layering structure 106 are reorganized such that a new optimized container image layering structure 109 is defined to be used for generation of container image 111. This reorganization is performed based on the modification factors, which are determined based on modification events tracked for each one of the software elements over an interval of time.

FIG. 2B is a flow diagram illustrating exemplary operations for determination of a modification factor of a software element according to some example implementations. The modification factor is indicative of the rate of change of the software element during the interval of time. The modification factor is determined for each one of the software elements and is based on modification recorded for the software element when compared to the modifications recorded for the other software elements. In some implementations, the modification factor can be a numerical value (e.g., a real number in range [0 . . . 1]), in which a small value (e.g., closer to 0) indicates that the software element does not change frequently when compared to other ones of the software elements 102, and a greater value (e.g., closer to 1) indicates that the software element changes more frequently when compared to other ones of the software elements 102. In other words, the modification factor can be seen as an approximation of the velocity of changes that occur in a software element. In some implementations, the determination of the modification factor for each software element is performed based on the operations described in FIG. 2B.

A release event is an event in which the software elements are uploaded to cause an update or a generation of the container image. In some implementations, a release event can be a first-time deployment of the container image. When the release event is a first-time deployment of the container image, all the sub-images of the container image are uploaded to the registry and/or to local storages. Alternatively, a release event ca be an update of a previously deployed container image. When the release event is an update of the container image a subset of the sub-images can be uploaded to the registry and/or the local storages depending on which sub-image needs to be modified. In these implementations, an update of a sub-image causes the sub-image as well as all other sub-images that are on top of the sub-image, as defined in the layering structure, are uploaded. In some implementations, the release events are performed based on a previous container image layering structure (e.g., 106), which is not an optimized layering structure.

At operation 214, the event modification analyzer 120 determines, for each software element from the software elements 102, a number of release events of the software elements in which a change occurred in the software element during the interval of time. In some examples, a software element is modified at each release event, in which case the number of release events in which the software element has been updated equals the total number of release events that occurred during the interval of time. In other examples, a software element is not modified at each release event of the software elements and the number of release events in which the software element has been modified is smaller than the total number of release events for the software elements. At operation 216, the event modification analyzer 120 determines a total number of release events of the software elements. At operation 28, the event modification analyzer 120 obtains the modification factor for the software element by dividing the number of release events of the software elements in which a change occurred in the software element during the interval of time by the total number of releases of the plurality of software elements that occurred during the interval of time.

While FIG. 2B illustrates an exemplary mechanism for determining a modification factor for a software element from the software elements 102, other mechanisms can be used to determine the modification factor. FIG. 2C is a flow diagram illustrating exemplary operations for the determination of a container image layering structure according to some example implementations. The container image layering structure is determined based on the modification factor such that the less frequently updated software elements (associated with low modification factors) are positioned at the bottom of the layering structure while the most frequently updated software elements (e.g., associated with high modification factors) are positioned at the top of the layering structure.

In some implementations, the container image layering structure generator 130 determines the container image layering structure further based (block 222) on dependencies between the software elements. For example, if a software element needs to have one or more other software elements installed before being installed when the container image is generated, this dependency of the software element with the other elements is taken into consideration by the container image layering structure generator 130 when determining the sub-image that is to include each software element.

In some implementations (block 224), the container image layering structure generator 130 determines the container image layering structure further based on a predetermined storage size. For example, container image layering structure generator 130 is configured such that each one of the container sub-images is not to exceed a predetermined storage size such. This causes container image layering structure generator 130 to select software elements to be included in each one of the sub-images such that a cumulative storage size of these software elements selected to not exceed the predetermined storage size.

In some implementations, each one of the software elements belongs to one of multiple software element categories including at least one of a software package, a documentation file, a configuration file, and a library file. In some of these implementations, the container image layering structure generator 130 may further determine the container image layering structure based on the categories of the software elements. For example, the container image layering structure generator 130 may categorize, at operation 228, the modification events based on the software element categories; and may determine at operation 230 a container image layering structure further based on the categorizing of the modification events.

The implementations described herein enable generation of an optimized container image layering structure. The optimized container image layering structure enables a fast and efficient deployment of a container image and an efficient update of the container image. When an optimized container image is deployed based on the optimized container layering structure, an update of the container image will affect only a small set of the sub-images. Thus, in contrast to conventional approaches in which the rate of change of the software elements was not taken into consideration when the container image layering structure was generated, the present implementations allow for a mechanism of generation of the layering structure that is dynamic and adaptable based on the rate of modification of each software element when compared to other software elements.

This can be particularly useful in the context of complex cloud service offerings (such as a customer relationship management (CRM) service (e.g., Sales Cloud by salesforce.com, Inc.)), which can be implemented using a significantly large container image that includes a large number of software elements. In these exemplary scenarios, the more sub-images that are present in the local storage of the clients, and the more these sub-images are not modified by a new service container image, the more efficient it is to assemble the service container image by reusing what is already present. The implementations described herein allow the automatic identification of the software elements that are modified the most frequently and the automatic determination of the layering structure based on the modification factors such that a container image obtained based on the determined layering structure is optimal.

Exemplary Implementations

Receipt of data by the system may occur differently in different implementations (e.g., it may be pushed to the system (often referred to as a push model), pulled by the system (often referred to as a pull model), etc.)

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third party application developers providing applications/services and another set of tenants may be customers of different ones or all the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
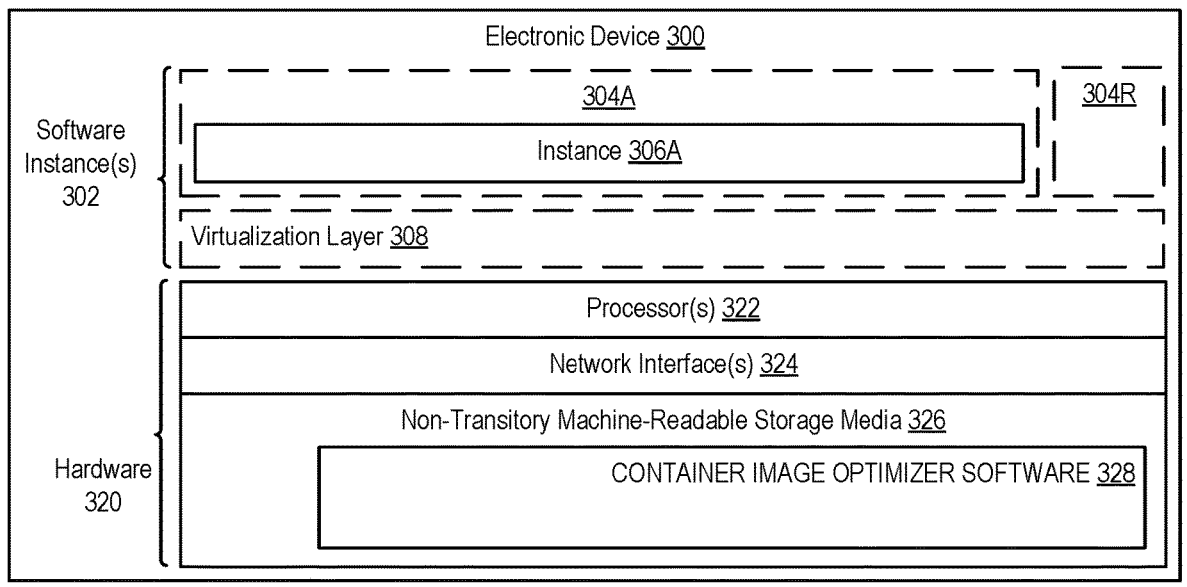
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein container image optimizer software 328 (which includes instructions executable by the set of one or more processor(s) 322). Each of the previously described components of the system 100 may be implemented in one or more electronic devices 300. In one implementation, each one of the developers 101 uses an electronic device 300 to modify/ update or generate the software elements 102 that reside on one or separate ones of the electronic devices 300. Further one or more electronic devices 300 can be used to implement the container image optimizer 160 (e.g., the software 328 represents the software to implement the container image optimizer 160), the modification tracker 110 (e.g., the software 328 represents the software to implement the modification tracker 110); 2) the above describe container image optimizer 160 is implemented in a separate set of one or more of the electronic devices 300 (e.g., a set of one or more server electronic devices where the software 328 represents the software to implement the above described modification events analyzer and/or the container image layering structure generator); and 3) in operation, the electronic devices implementing the components of the system 100 would be communicatively coupled (e.g., by a network) and would establish between them (or through one or more other layers) connections for submitting requests and returning responses. Other configurations of electronic devices may be used in other implementations (e.g., an implementation in which all the components of system 100 are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

Figure 3B:
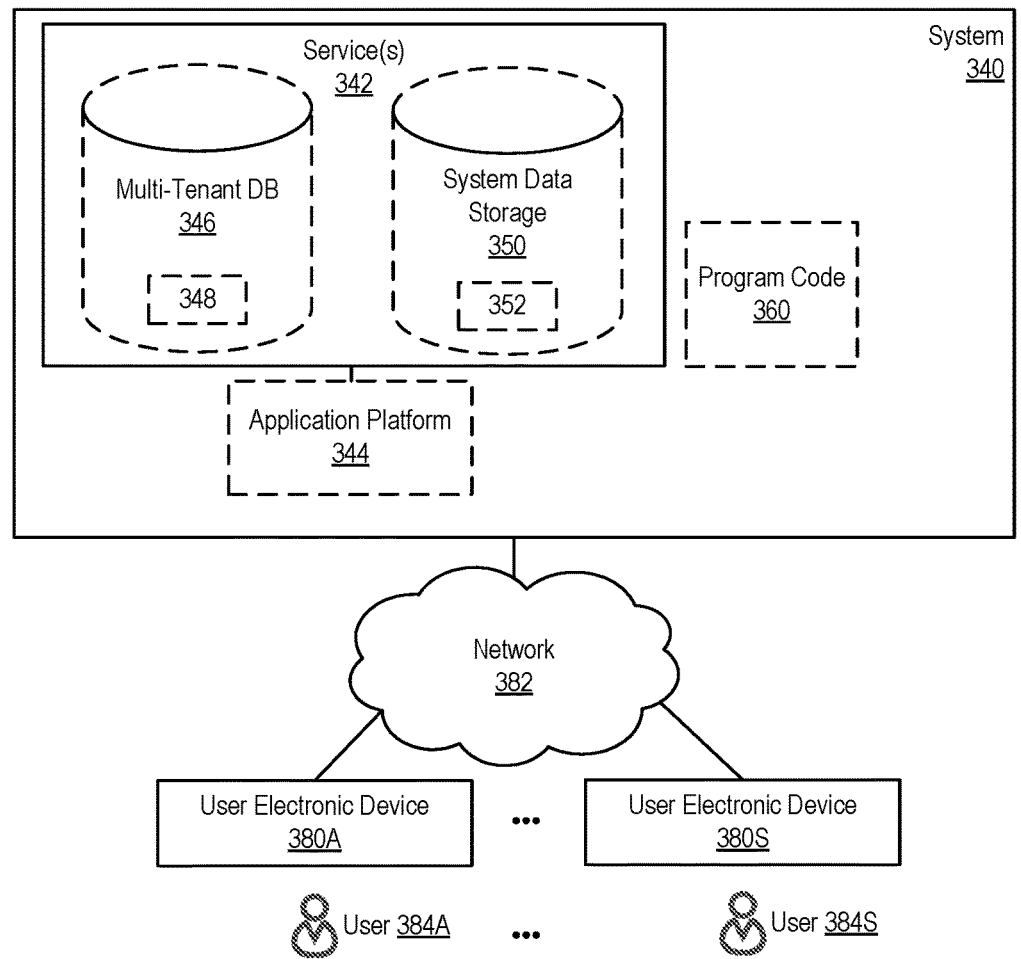
FIG. 3B is a block diagram of an environment where the above discussed optimization of container image layering technique may be deployed, according to some implementations.

FIG. 3B is a block diagram of an environment where the above discussed optimization of container image layering technique may be used, according to some implementations. A system 340 includes hardware (a set of one or more electronic devices) and software to provide service(s) 342. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communicate with each other and/or with one or more of the user electronic devices 380A-S via one or more Application Programming Interface(s) (APIs) (e.g., a Representational State Transfer (REST) API). The user electronic devices 380A-S are operated by users 384A-S.

The application(s) providing one or more of the service(s) 342 are generated based on an optimized container image that is created based on a layering structure determined according to the implementations described above. Thus, the system 340 includes at least one new container image of FIG. 1A.

The system 340 may be implemented in a single data center or span multiple data centers.

The service(s) 342, including the one or more services provided by application(s) that are generated based on an optimized container image, include a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, the system 340 is a multi-tenant cloud computing architecture and one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others.

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for optimization of layering of a container image, the method comprising:
    receiving modification events from a software element repository that records changes to one or more of a plurality of software elements;
    determining, based on the modification events, for the one or more of the plurality of software elements a modification factor indicative of the rate of change of the software element during the interval of time,
    wherein the container image is to be generated based on the plurality of software elements, and
    wherein each modification event is indicative of one or more changes that occurred in one of the plurality of software elements during an interval of time;
    determining a container image layering structure, based at least in part on the modification factors of the software elements, wherein the container image layering structure defines a layering order for two or more container sub-images that form the container image,
    wherein the layering order determines an order with which the container sub-images are to be executed to form the entire container image, and the container image layering structure further defines for each one of the container sub-images a respective subset of one or more software elements from the plurality of software elements; and
    storing the container image based on the container image layering structure to be used for generation of one or more containers in a cloud processing system,
    wherein software elements that are updated more frequently than other software elements from the plurality of software elements are stored as part of top container sub-images of the container image.

2. The method of claim 1, wherein determining the container image layering structure is further based on dependencies between the software elements.

3. The method of claim 1, wherein each one of the container sub-images is not to exceed a predetermined storage size, and wherein determining the container image layering structure is further based on the predetermined storage size such that a cumulative storage size of software elements selected to be included in each one of the container sub-images does not exceed the predetermined storage size.

4. The method of claim 1, wherein each one of the software elements belongs to one of a plurality of software element categories including at least one of a software package, a documentation file, a configuration file, a library file.

5. The method of claim 4, wherein the determining the container image layering structure includes:
    categorizing the modification events based on the plurality of software element categories; and
    wherein the determining a container image layering structure is further based on the categorizing of the modification events.

6. The method of claim 1, wherein determining a modification factor of a software element includes:
    determining a number of release events of the plurality of software elements in which a change occurred in the software element during the interval of time, wherein a release event of the plurality of software elements causes an update of the container image;
    determining a total number of release events of the plurality of software elements; and
    obtaining the modification factor for the software element by dividing a number of release events of the plurality of software elements in which a change occurred in the software element during the interval of time by a total number of releases of the plurality of software elements that occurred during the interval of time.

7. The method of claim 1, wherein each one of the modification events includes one or more of an identification of a software element that is modified, a time indicator indicating a time and date at which modification of the software element occurred, a project identifier, a directory identifier, an author identifier, a size, and other parameters related to the change that occurred in the software element.

8. A non-transitory machine-readable storage medium that provides instructions that, if executed by a machine, will cause said machine to perform operations comprising:

receiving modification events from a software element repository that records changes to one or more of a plurality of software elements;

determining, based on the modification events, for the one or more of the plurality of software elements a modification factor indicative of the rate of change of the software element during the interval of time, wherein the container image is to be generated based on the plurality of software elements, and wherein each modification event is indicative of one or more changes that occurred in one of the plurality of software elements during an interval of time;

determining a container image layering structure, based at least in part on the modification factors of the software elements, wherein the container image layering structure defines a layering order for two or more container sub-images that form the container image, wherein the layering order determines an order with which the container sub-images are to be executed to form the entire container image, and the container image layering structure further defines for each one of the container sub-images a respective subset of one or more software elements from the plurality of software elements; and storing the container image based on the container image layering structure to be used for generation of one or more containers in a cloud processing system, wherein software elements that are updated more frequently than other software elements from the plurality of software elements are stored as part of top container sub-images of the container image.

9. The non-transitory machine-readable storage medium of claim 8, wherein determining the container image layering structure is further based on dependencies between the software elements.

10. The non-transitory machine-readable storage medium of claim 8, wherein each one of the container sub-images is not to exceed a predetermined storage size, and wherein determining the container image layering structure is further based on the predetermined storage size such that a cumulative storage size of software elements selected to be included in each one of the container sub-images does not exceed the predetermined storage size.

11. The non-transitory machine-readable storage medium of claim 8, wherein each one of the software elements belongs to one of a plurality of software element categories including at least one of a software package, a documentation file, a configuration file, a library file.

12. The non-transitory machine-readable storage medium of claim 11, wherein the determining the container image layering structure includes:

categorizing the modification events based on the plurality of software element categories; and wherein the determining a container image layering structure is further based on the categorizing of the modification events.

13. The non-transitory machine-readable storage medium of claim 8, wherein the determining a modification factor of a software element includes:

determining a number of release events of the plurality of software elements in which a change occurred in the software element during the interval of time, wherein a release event of the plurality of software elements causes an update of the container image;

determining a total number of release events of the plurality of software elements; and obtaining the modification factor for the software element by dividing a number of release events of the plurality of software elements in which a change occurred in the software element during the interval of time by a total number of releases of the plurality of software elements that occurred during the interval of time.

14. The non-transitory machine-readable storage medium of claim 8, wherein each one of the modification events includes one or more of an identification of a software element that is modified, a time indicator indicating a time and date at which modification of the software element occurred, a project identifier, a directory identifier, an author identifier, a size, and other parameters related to the change that occurred in the software element.

* * * * *